(12) United States Patent
Kasuga

(10) Patent No.: US 7,424,726 B2
(45) Date of Patent: Sep. 9, 2008

(54) MOUNTING MECHANISM FOR MOUNTING A CARTRIDGE OR AN OPTICAL DISC TO THE TRAY OF AN OPTICAL DISC DEVICE

(75) Inventor: Kyoji Kasuga, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 55 days.

(21) Appl. No.: 10/562,300

(22) PCT Filed: Apr. 28, 2004

(86) PCT No.: PCT/JP2004/006228

§ 371 (c)(1),
(2), (4) Date: Dec. 22, 2005

(87) PCT Pub. No.: WO2004/114297

PCT Pub. Date: Dec. 29, 2004

(65) Prior Publication Data

US 2007/0101346 A1 May 3, 2007

(30) Foreign Application Priority Data

Jun. 24, 2003 (JP) ............................. 2003-179884

(51) Int. Cl.
*G11B 17/04* (2006.01)
*G11B 33/02* (2006.01)

(52) U.S. Cl. .................... 720/612; 720/640

(58) Field of Classification Search ............... 720/612, 720/640, 627, 600, 601, 603, 615, 617; 369/30.93, 369/30.96, 30.97, 30.69
See application file for complete search history.

(56) References Cited

U.S. PATENT DOCUMENTS

| | | | | |
|---|---|---|---|---|
| 4,928,271 A * | 5/1990 | Verhagen | ................... | 369/292 |
| 5,142,523 A * | 8/1992 | Kamoshita | .................. | 720/632 |
| 5,793,729 A * | 8/1998 | Soga et al. | .................. | 720/603 |
| 5,844,874 A * | 12/1998 | Saito et al. | .................. | 720/612 |
| 6,052,352 A * | 4/2000 | Liou | .......................... | 720/603 |
| 6,421,311 B1 * | 7/2002 | Nakazato et al. | ............ | 720/604 |
| 6,473,382 B1 * | 10/2002 | Tagawa et al. | .............. | 720/616 |
| 6,618,340 B1 * | 9/2003 | Sawada | ...................... | 720/603 |
| 6,973,660 B2 * | 12/2005 | Obata | ......................... | 720/616 |
| 7,003,784 B2 * | 2/2006 | Naoki | ........................ | 720/601 |
| 7,051,345 B2 * | 5/2006 | Ohgaki | ....................... | 720/603 |

(Continued)

FOREIGN PATENT DOCUMENTS

JP 06-111444 4/1994

(Continued)

*Primary Examiner*—Brian E. Miller
*Assistant Examiner*—Matthew G Kayrish
(74) *Attorney, Agent, or Firm*—George W. Neuner; David G. Conlin; Edwards Angell Palmer & Dodge LLP

(57) ABSTRACT

An optical disc device is provided with a tray for mounting a disc or a cartridge thereon, a chassis that is laid out under the tray, and a top plate that is laid out above the tray. The optical disc device comprises two types of holding mechanisms that form either a single disc mounting space or a cartridge mounting space according to a shape of a single disc or a cartridge to be mounted in the tray, and hold the single disc or the cartridge in the respective mounting space.

7 Claims, 7 Drawing Sheets

U.S. PATENT DOCUMENTS

2001/0048652 A1* 12/2001 Kageyama et al. ......... 369/77.2
2006/0075415 A1* 4/2006 Naoki ........................ 720/601

FOREIGN PATENT DOCUMENTS

| JP | 09-007267 | 1/1997 |
| JP | 09-091821 | 4/1997 |
| JP | 10-064150 | 3/1998 |
| JP | 11-185345 | 7/1999 |

* cited by examiner

MOUNTING MECHANISM FOR MOUNTING A CARTRIDGE OR AN OPTICAL DISC TO THE TRAY OF AN OPTICAL DISC DEVICE

TECHNICAL FIELD

The present invention relates to an optical disc device in which a single disc or a cartridge housing a disc is mounted on the mounting surface of a tray and is loaded into the body of the optical disc device. The present invention relates more specifically to an optical disc device that can be used while the mounting surface of a tray is set along either direction, the horizontal direction or the vertical direction.

BACKGROUND OF THE INVENTION

Currently, single optical discs, such as CDs and DVDs, and cartridges housing an optical disc, such as DVD-RAM, for purposes including protection of the surface of the disc have been used as information storage media for computers, audio visual devices, and others.

Consequently, optical disc devices in which such a single disc or cartridge is mounted on a tray, and then loaded into the body thereof have been developed.

In addition, the footprints of computers, audio visual devices, and others have been increasingly reduced and users' use thereof has become diverse. For these reasons, it has been necessary to develop computers and audio visual devices that can be placed both horizontally and vertically. This also applies to optical disc devices, and those that can be used in both horizontal and vertical orientations have been developed.

Examples of such conventional optical disc devices include a device having a tray that is provided with a disc holding portion that is retractable on the mounting surface for mounting a single disc or a cartridge that, when a single disc is mounted on the tray with the mounting surface set vertically, protrudes above the mounting surface of the tray so that the periphery portion of the single disc or the cartridge is held by the disc holding portion, and that, when a cartridge is mounted on the tray with the mounting surface set vertically or when either a single disc or a cartridge is mounted on the tray with the mounting surface set horizontally, sinks under the mounting surface of the tray (for example, see Japanese Patent No. 3012172 published on Jan. 10, 1997 (hereinafter referred to as Patent document 1).

In addition, there is also an optical disc device that, in addition to the above-described disc holding portion, is provided with another disc holding portion that can freely move in the tray transfer direction, to be used together with the above-described retractable disc holding portion (for example, see Japanese Patent No. 2882321 published on Apr. 4, 1997 (hereinafter referred to as Patent document 2)).

Furthermore, there is an optical disc device that has a tray provided with a disc holding member and that can form a single disc mounting space in a vertical orientation so that the periphery portion of the disc is held when a single disc is mounted on the mounting surface that has been set vertically as well as a single disc mounting space in a horizontal orientation so that the periphery portion of the disc is held when a single disc is mounted on the mounting surface that has been set horizontally, although it cannot handle a cartridge (for example, see Japanese Patent No. 3321851 published on Apr. 22, 1994 (hereinafter referred to as Patent document 3)).

However, according to the configurations of the optical disc devices described in the above-described Patent documents 1 and 2, since a disc holding portion is retractable on the holding surface (mounting surface) of a tray, the disc holding portion protrudes from the bottom surface of the tray when in a state in which the disc holding portion is sunk. This imposes limitations on the layout of components under the tray. In addition, if a tray with an increased thickness is used so that the disc holding portion does not protrude from the bottom surface of the tray, the thickness of the optical disc device as a whole becomes large.

According to the configurations of the optical disc device described in the above-described Patent document 2, a disc holding portion that can freely move in the tray transfer direction is provided, and a cartridge is sandwiched and held by drive springs that have been provided in the disc holding portion. However, an optical pickup for recording and reproducing information on and from a disc that has been housed in a cartridge is disposed in a portion to which the disc holding portion is transferred, and the optical pickup passes through under the disc holding portion during recording and reproducing of the periphery portion of the disc. For this reason, the disc holding portion cannot be placed lower than the recording surface of the disc, which makes it impossible to reduce the thickness of the optical disc device as a whole.

In addition, in the configurations of the optical disc device described in the above-described Patent document 3, only a method for holding a single disc is disclosed without description on application to a cartridge, and a cartridge cannot be mounted.

Additionally, although it is not mentioned in the above-described Patent documents 1, 2, and 3, a clamper is placed at a location opposite from the turn table across the disc so that the disc can be chucked to the turn table. This clamper is provided with a clamper arm to enable handling of both the single disc and the cartridge. The clamper is stationed out of the way by the clamper arm during loading of a cartridge to avoid contact between the clamper and the cartridge. Since the clamper arm is configured so that the other end thereof is operated by a protrusion provided to the tray, its height is limited to prevent interference between the other end of the clamper arm and the above-described disc holding portion. Consequently, the disc holding portion is restricted by the optical pickup on its lower side and by the clamper arm on its upper side, which makes its thickness small and its strength weak.

Given these factors, the present invention is carried out in view of the above-described problems, and has an object of providing a small-sized optical disc device that allows arbitral setting of the tray orientation, such as horizontal and vertical, and that can handle both a single disc and a cartridge housing a disc as an external information storage medium to be mounted on a tray.

SUMMARY OF THE INVENTION

An optical disc device according to the present invention that is carried out to accomplish the above-described purposes is an optical disc device for recording and reproducing information on and from a single disc or a cartridge housing a disc, either of which is mounted on a mounting surface of a tray and loaded therewith into a body of the optical disc device, the optical disc device comprising, a holding mechanism that forms either a single disc mounting space or a cartridge mounting space according to a shape of a single disc or a cartridge to be mounted in the tray, and holds the single disc or the cartridge in the respective mounting space, wherein the holding mechanism can pivot around a predetermined supporting point in a direction of a face of the single disc or the cartridge to be mounted.

According to the present invention, the tray is provided with the holding mechanism, and the holding mechanism can pivot around a predetermined supporting point in a direction of a face of the single disc or the cartridge to be mounted, which makes it possible to reduce the thickness of the tray as the holding mechanism is pivoted on the tray without protruding in the thickness direction of the tray. In addition, since the holding mechanism imposes no limitations on the layout of components under the tray, the thickness of the optical disc device can be reduced.

In the above-described configurations, in order to mount a single disc on the mounting surface in the single disc mounting space, the holding mechanism is provided with a first disc radial direction restricting portion whose radius is larger than that of the single disc as measured from an approximate center thereof when the single disc is mounted on the tray, a first disc thickness direction restricting portion that restricts movement of the single disc in a disc thickness direction, and a disc bottom guide portion that guides the single disc to the mounting surface, and, in order to mount the cartridge on the mounting surface in the cartridge mounting space, the holding mechanism is further provided with a cartridge restricting portion that has the same shape as at least a part of a front end of the cartridge as viewed in a loading direction to the tray, and a first cartridge thickness direction restricting portion that restricts movement of the cartridge in a cartridge thickness direction and that has the same shape as at least a part of a front end of the cartridge as viewed in a loading direction to the tray.

In this case, since the holding mechanism is provided with the first disc radial direction restricting portion, the first disc thickness direction restricting portion, the disc bottom guide portion, the cartridge restricting portion, and the first cartridge thickness direction restricting portion, both a single disc and a cartridge can be mounted on the tray. In addition, since a front end of the cartridge in the loading direction is restricted in the cartridge thickness direction, the cartridge does not fall off and is held in place on the tray even when the mounting surface of the tray is set vertically. Movement of the single disc or the cartridge mounted on the mounting surface in the single disc mounting space or the cartridge mounting space can thus be restricted in all the directions.

In the above-described configurations, the holding mechanism may be biased with an elastic member so that the single disc mounting space is formed.

In this case, since the holding mechanism is biased with an elastic member so that the single disc mounting space is formed, it is not only easy to mount the single disc on the predetermined mounting surface in the single disc mounting space when mounting the single disc on the tray, but also easy to mount, when mounting the cartridge on the tray, the cartridge on the predetermined mounting surface in the cartridge mounting space as the cartridge is pressed and held by the bias force of the elastic member. Additionally, the disc or the cartridge can be mounted on the tray without falling off even when the mounting surface of the tray is set vertically In the above configurations, pivotal movements of the plurality of the holding mechanisms may be linked with each other.

In this case, since the pivotal movements of the plurality of the holding mechanisms are linked with each other when the disc or the cartridge is mounted on the tray, it is possible to facilitate mounting of the disc or the cartridge on the predetermined mounting surface of the tray.

In addition, in the above-described configurations, in order to mount a single disc on the mounting surface in the single disc mounting space, the holding mechanism is provided with a second disc radial direction restricting portion whose radius is larger than that of the single disc as measured from an approximate center thereof when the single disc is mounted on the tray, and a second disc thickness direction restricting portion that restricts movement of the single disc in a disc thickness direction, and in order to mount a cartridge on the mounting surface in the cartridge mounting space, the holding mechanism is further provided with a second cartridge thickness direction restricting portion that restricts movement of the cartridge in a cartridge thickness direction and that has the same shape as at least a part of a rear end of the cartridge as viewed in a loading direction to the tray.

In this case, since the holding mechanism is provided with the second disc radial direction restricting portion, the second disc thickness direction restricting portion, and the second cartridge thickness direction restricting portion, both the single disc and the cartridge can be mounted on the tray. In addition, since the rear end of the cartridge in the loading direction is restricted in the cartridge thickness direction, the cartridge does not fall off and is held in place on the tray even when the mounting surface of the tray is set vertically. Movement of the single disc or the cartridge mounted on the mounting surface in the single disc mounting space or the cartridge mounting space can thus be restricted in all the directions.

Furthermore, in the above-described configurations, a plurality of the holding mechanisms may be provided.

In this case, since the plurality of the holding mechanisms are provided, the disc or the cartridge can be held more securely.

DESCRIPTION OF THE PREFERRED EMBODIMENTS

Hereinafter, embodiments of the present invention will be described with reference to the accompanying drawings.

Embodiment 1

Figure 1:
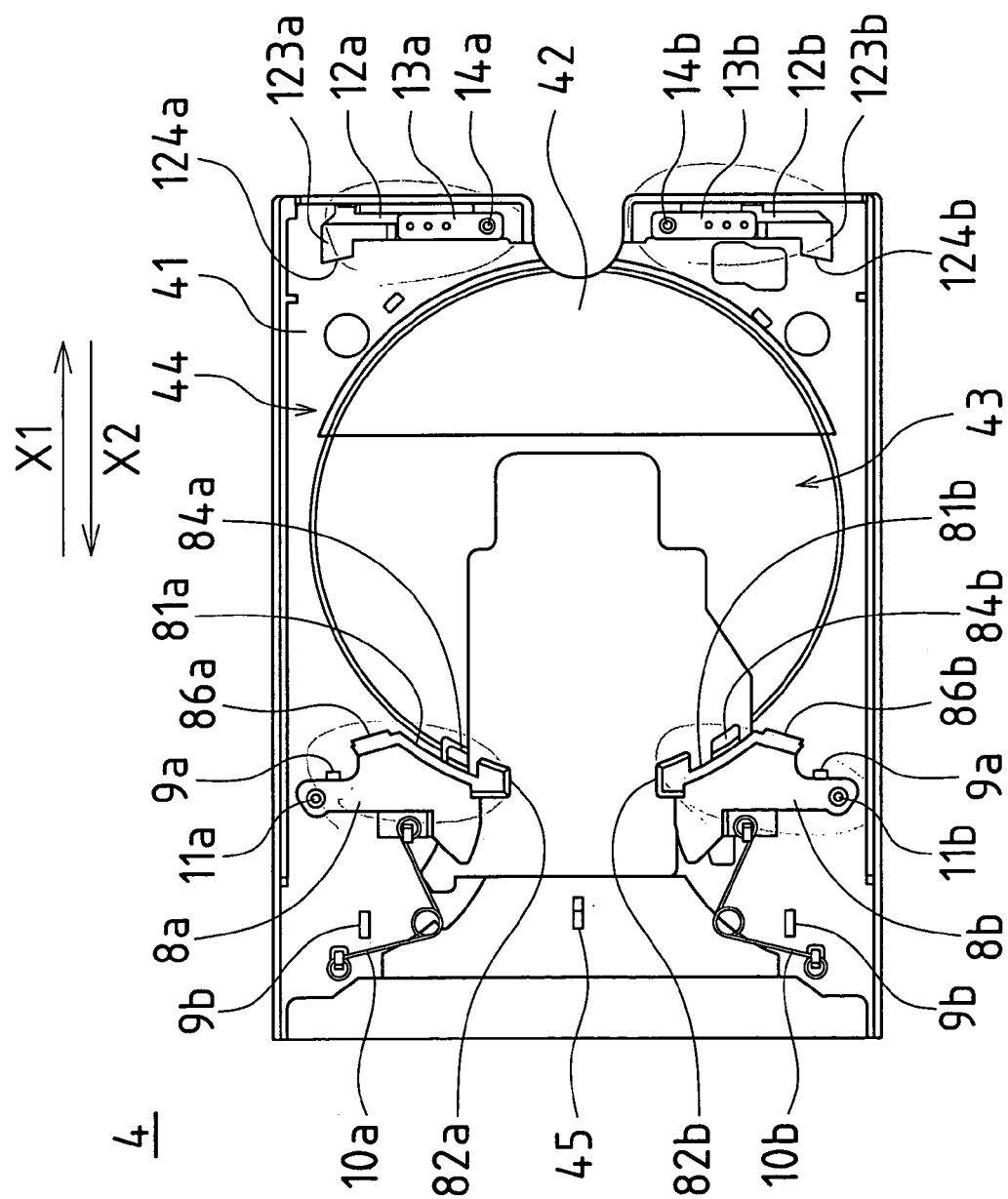
FIG. 1 is a plan view of a tray of an optical disc device according to Embodiment 1 of the present invention.
Figure 2:
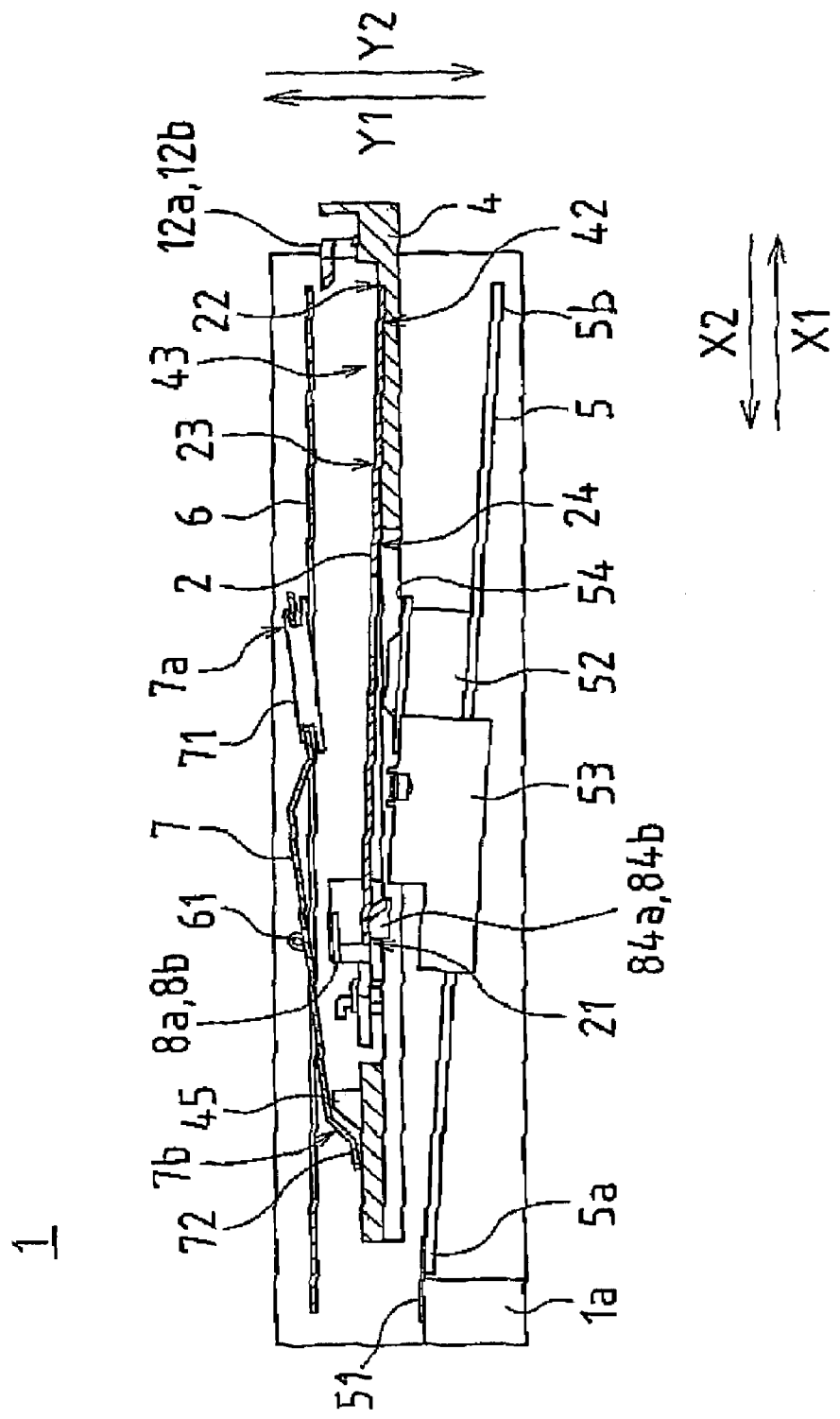
FIG. 2 is a side view of the internal configuration of an optical disc device according to Embodiment 1 of the present invention in a state in which a part of a tray is projecting from the optical disc device.
Figure 3:
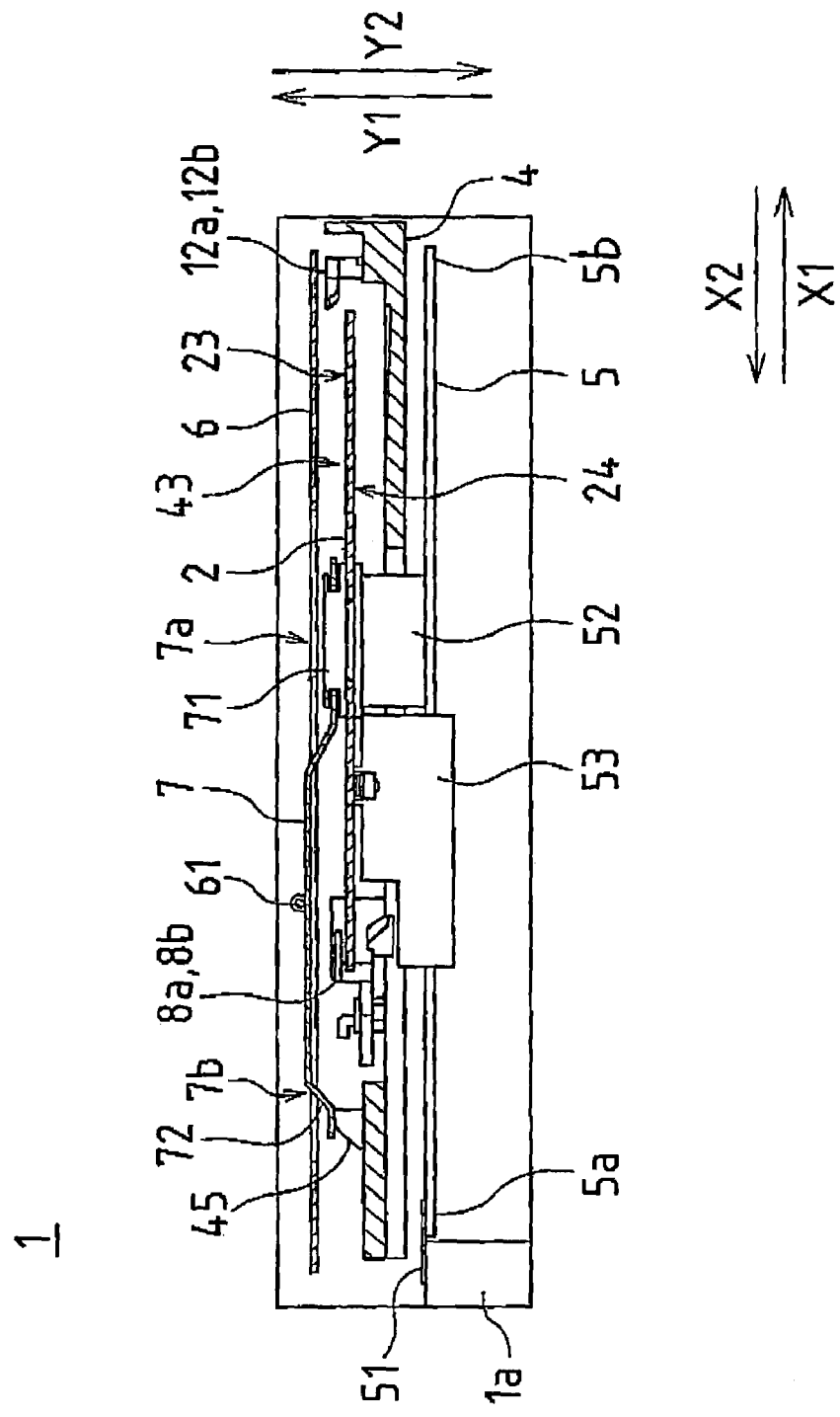
FIG. 3 is a side view of the internal configuration of an optical disc device according to Embodiment 1 of the present invention during loading with a disc mounted on the tray.

As shown in FIGS. 1 to 3, an optical disc device 1 is provided with a tray 4 for mounting a single disc 2 (hereinafter referred to as disc) or a cartridge 3 housing a disc (in Embodiment 1, a disc the same as the disc 2 is used for convenience) (hereinafter referred to as cartridge, see FIG. 7), a chassis 5 placed below the tray 4, and a top plate 6 placed above the tray 4.

With a loading mechanism (not shown), the tray 4 can move (in the directions X1 and X2) to the eject position (outside of the optical disc device 1, see FIG. 2) in which the disc 2 or the cartridge 3 can be inserted or removed and to the loaded position (inside of the optical disc device 1, see FIG. 3) in which recording and reproducing of the disc 2 or the cartridge 3 is possible.

In addition, an end 5a of the chassis 5 (front-side of the tray 4 in the loading direction (direction X2)) is fixed to a device body 1a through a blade spring 51 as shown in FIGS. 2 and 3. Additionally, with an ascent/descent mechanism (not shown), the other end 5b of the chassis 5 (rear-side of the tray 2 in the loading direction (direction X2)) can move up and down (directions Y1 and Y2 shown in FIGS. 2 and 3). The ascent/descent mechanism is linked with the movement of the tray 4. In other words, when the tray 4 moves from the loaded position to the eject position, the other end 5b of the chassis 5 moves to a location farther away from the disc 2 or the cartridge 3 (direction Y2), and when the tray 4 moves from the eject position to the loaded position, the other end 5b of the chassis 5 moves to a location closer to the disc 2 or the cartridge 3 (direction Y1) (location in which the disc 2 can be chucked).

The chassis 5 is provided with a spindle motor 52 for rotating the disc 2 as well as an optical pickup 53 for recording and reproducing information on and from the disc 2.

The spindle motor 52 is provided with a turn table 54 for holding and rotating the disc 2.

The optical pickup 53 is installed so that it can move in the radial direction of the disc 2.

In addition, the top plate 6 is provided with a supporting point 61. At the supporting point 61, a clamper arm 7 is held in a way that it can pivot.

A clamper 71 that has a built-in magnetic substance therein (not shown) is provided in an end 7a of the clamper arm 7. The clamper 71 is held at a location immediately above the spindle motor 52. The clamper arm 7 is biased with a blade spring (not shown) so that the clamper 71 is moved in the direction away from the spindle motor 52 (direction Y1). In addition, the other end 7b of the clamper arm 7 is bent so that a contact portion 72 is formed. The contact portion 72 touches a protrusion 45 of the tray 4 (see below) when the tray 4 is positioned to the loaded position (location shown in FIG. 3), and with this contact, the end 7a of the clamper arm 7 is lowered to chuck the disc 2 between the clamper 71 and the turn table 54.

Furthermore, as shown in FIG. 1, the optical disc device 1 comprises a holding mechanism that forms either a single disc mounting space 43 or a cartridge mounting space 44 according to a shape of the disc 2 or the cartridge 3 to be mounted in the tray 4, and holds the disc 2 or the cartridge 3 in the respective mounting space 43 or 44. In other words, with the holding mechanisms, a cartridge mounting surface 41 (the mounting surface in the cartridge mounting space according to the present invention) as well as a single disc mounting surface 42 (the mounting surface in the single disc mounting space according to the present invention) having its front-side of the loading direction (direction X2) tilted upward in relation to the cartridge mounting surface 41 are formed. In addition, the tray 4 is provided with the protrusion 45 to prevent collision with the clamper arm 7 during loading of the disc 2 or the cartridge 3 and to ensure contact with the clamper 71 upon loading of the disc 2 or the cartridge 3.

The first type of the holding mechanisms is constituted with front-end holding members 8a and 8b that are laid out almost symmetrically on the front side of the loading direction of the tray 4 (direction X2), stoppers 9a and 9b that limit movement of the front-end holding members 8a and 8b, and springs 10a and 10b (elastic members according to the present invention) that bias the front-end holding members 8a and 8b.

The front-end holding members 8a and 8b can pivot around a predetermined supporting point 11a and 11b in a direction of a face of the disc 2 or the cartridge 3 to be mounted (direction X shown in FIGS. 2 and 3).

Hereafter, the front-end holding member 8a will be explained with reference to FIG. 4. Since the front-end holding member 8b has the same configuration as the front-end holding member 8a with the only difference being that it is bilaterally symmetrical, explanation on the front-end holding member 8b will be omitted.

The front-end holding member 8a can pivot around the supporting point 11a between the stoppers 9a and 9b, and, as shown in FIG. 1, is biased counterclockwise with the spring 10a in the direction of contact with the stopper 9a. When the front-end holding member 8a touches the stopper 9a, the single disc mounting space 43 in which, between the disc 2 and the cartridge 3, only the disc 2 can be mounted is formed on the mounting surface of the tray 4.

Figure 4:
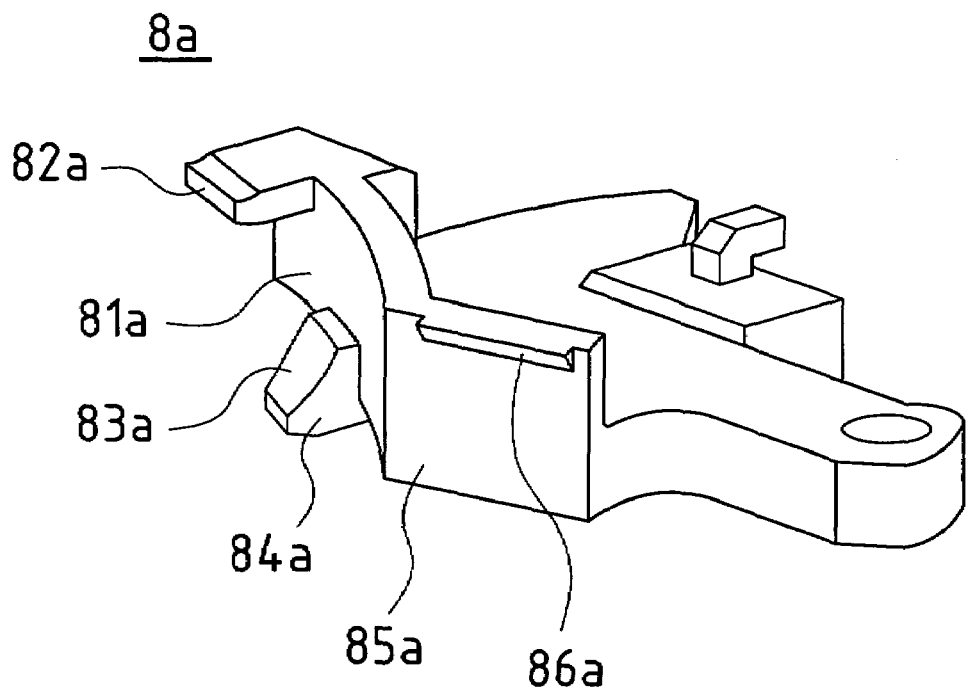
FIG. 4 is a perspective view of one of the front-end holding members that are provided in an optical disc device according to Embodiment 1 of the present invention.

In addition, as shown in FIG. 4, in order to mount the disc 2 in the single disc mounting space 43, the front-end holding member 8a is provided with a first disc radial direction restricting portion 81a whose radius is larger than that of the disc 2 as measured from an approximate center thereof when the disc 2 is mounted on the tray 4, a first disc thickness direction restricting portion 82a in the shape of thin plate that restricts movement of the mounted disc 2 in the disc thickness direction, and a disc bottom guide portion 84a that has a tapered portion 83a formed thereon so that the disc 2 is guided onto the single disc mounting surface 43.

As shown in FIG. 2, a front-end 21 of the disc 2 as viewed in the disc loading direction (direction X2) (hereinafter referred to as the front-end) is raised by the disc bottom guide portion 84a so that placement is achieved at an angle to the tray 4.

Furthermore, as shown in FIG. 4, in order to mount the cartridge 3 in the cartridge mounting space 44, the front-end holding member 8a is provided with a cartridge restricting portion 85a that includes the same shape as at least a part of a front end 31 of the cartridge 3 toward the tray 4 and a first cartridge thickness direction restricting portion 86a that restricts movement of the mounted cartridge 3 in the cartridge thickness direction and that includes the same shape as at least a part of the front end 31 of the cartridge 3 toward the tray 4. When the cartridge 3 is loaded, the cartridge restricting portion 85a allows the front-end holding member 8a to pivot clockwise by a predetermined degree.

In addition, the first cartridge thickness direction restricting portion 86a protrudes from the upper section of the cartridge restricting portion 85a in the plane direction of the cartridge 3 (direction X).

As shown in FIG. 1, a holding mechanism of the second type is constituted with the rear-end holding members 12a and 12b that are laid out substantially symmetrically at the rear side of the tray 4 in the loading direction (direction X2) and blade springs 13a and 13b that are engaged to the rear-end holding members 12a and 12b.

As shown in FIG. 1, the rear-end holding members 12a and 12b can pivot around the supporting points 14a and 14b, which have been set in advance through the blade springs 13a and 13b, in a direction of a face of the disc 2 or the cartridge 3 to be mounted (direction X). In other words, the rear-end holding members 12a and 12b can pivot between the disc guide position P1 in which their ends 121a and 121b face toward the center portion of the tray 4 (see FIG. 6) and the cartridge guide position P2 in which their ends 121a and 121b face the direction away from the center portion of the tray 4 (see FIG. 7). The single disc mounting space 43 is formed by arranging the rear-end holding members 12a and 12b at the disc guide position P1 and the cartridge mounting space 44 is formed by arranging the rear-end holding members 12a and 12b at the cartridge guide position P2.

Hereafter, the rear-end holding member 12a will be explained with reference to FIG. 5. Since the rear-end holding member 12b has the same configuration as the rear-end holding member 12a with the only difference being that it is bilaterally symmetrical, explanation on the rear-end holding member 12b will be omitted.

Figure 5:
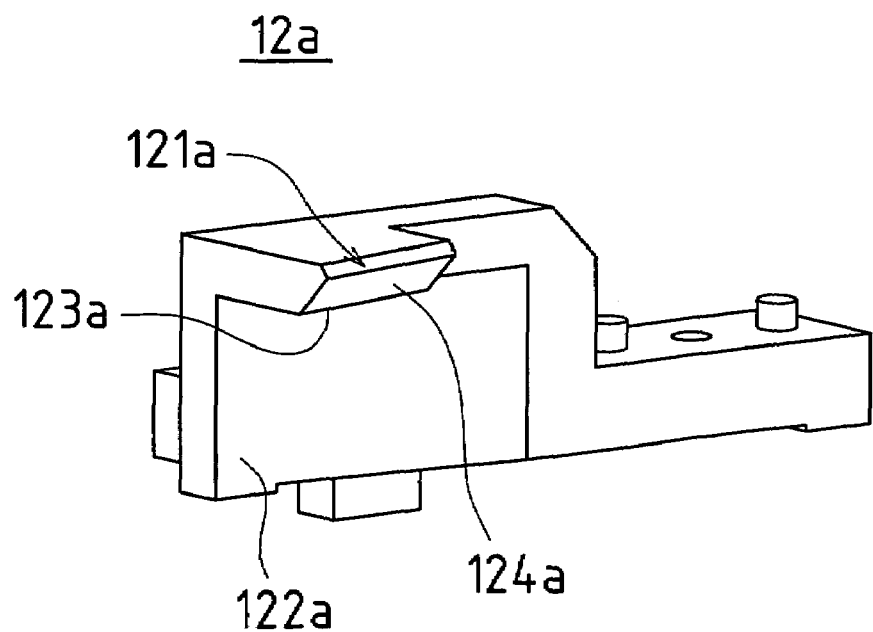
FIG. 5 is a perspective view of one of the rear-end holding members that are provided in an optical disc device according to Embodiment 1 of the present invention.

As shown in FIG. 5, in order to mount the disc 2 in the single disc mounting space 43 when the rear-holding member 12a is in the disc guide position P1, this rear-end holding member 12a is provided with a second disc radial direction restricting portion 122a whose radius is larger than that of the disc 2 as measured from an approximate center thereof when the disc 2 is mounted on the tray 4, and a second disc thickness direction restricting portion 123a in the shape of thin plate that restricts movement of the disc 2 in the disc thickness direction.

In addition, as shown in FIG. 5, in order to mount the cartridge 3 in the cartridge mounting space 44 when the rear-end holding member 12a is in the cartridge guide position P2, the rear-end holding member 12a is provided with a second cartridge thickness direction restricting portion 124a that restricts movement of the cartridge 3 in a cartridge thickness direction and that has the same shape as at least a part of the rear end of the cartridge 3 as viewed in a loading direction (direction X2) (hereinafter referred to as rear end).

Hereafter, operations for mounting the above-described disc 2 and cartridge 3 onto the tray 4 will be explained with reference to FIGS. 1 to 7.

First, operations for mounting the disc 2 when the mounting surface of the tray 4 is set horizontally will be explained. The front-end holding members 8a and 8b are in contact with the stopper 9a so that the single disc mounting space 43 is formed on the mounting surface (see FIG. 1).

As shown in FIGS. 1 and 2, the disc 2 is mounted on the single disc mounting surface 42 of the tray 4 that has the single disc mounting space 43 formed therein. In mounting the disc 2 on this single disc mounting surface 42, the front end 21 of the disc 2 is guided and restricted by the tapered portions 83a and 83b of the disc bottom guide portions 84a and 84b.

Then, the disc 2 is mounted on the single disc mounting surface 43 while a peripheral rim 22 of the disc 2 that has been mounted on the single disc mounting surface 42 is restricted by the first disc radial direction restricting portions 81a and 81b of the front-end supporting members 8a and 8b, a front surface 23 thereof is restricted by the first disc thickness direction restricting portions 82a and 82b of the front-end supporting members 8a and 8b, and a back surface 24 thereof is restricted by the disc bottom guide portions 84a and 84b (see FIG. 2).

Hereafter, operations for mounting the disc 2 when the mounting surface of the tray 4 is set vertically will be explained.

Figure 6:
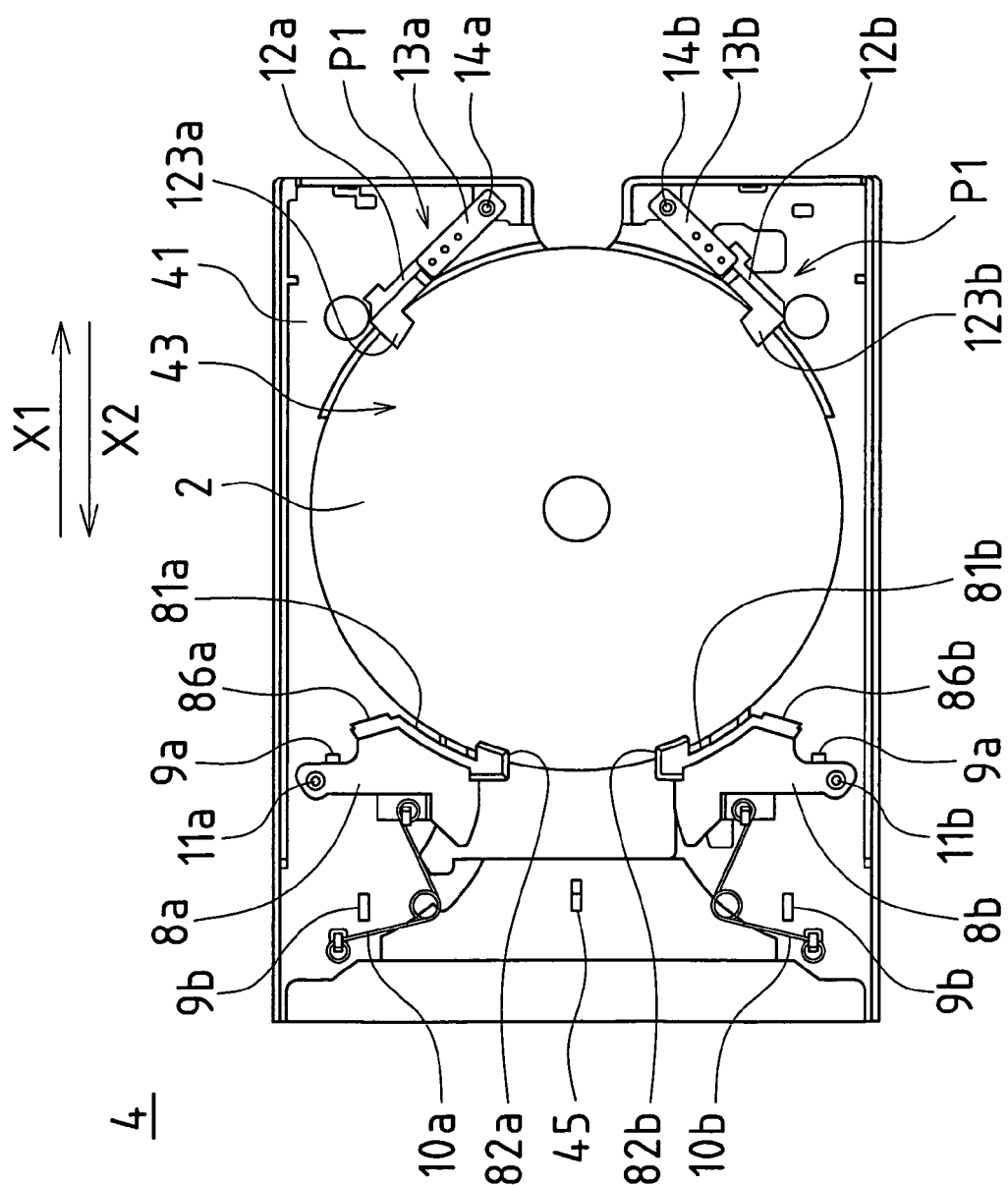
FIG. 6 is a plan view of a state in which a disc is mounted on a tray of an optical disc device according to Embodiment 1 of the present invention.

As shown in FIG. 6, the rear-end holding members 12a and 12b are pivoted so that the single disc mounting space 43 is formed, in other words, pivoted to the disc guide location P1. Then, the disc 2 is mounted on the single disc mounting surface 42 while the peripheral rim 22 of the disc 2 is restricted by the first disc radial direction restricting portions 81a and 81b of the front-end supporting members 8a and 8b and the second disc radial direction restricting portions 122a and 122b of the rear-end supporting members 12a and 12b, the surface 23 thereof is restricted by the first disc thickness direction restricting portions 82a and 82b of the front-end supporting members 8a and 8b and the second disc thickness direction restricting portions 123a and 123b of the rear-end supporting members 12a and 12b, and the back side thereof is restricted by the disc bottom guide portions 84a and 84b.

Hereafter, operations for mounting the cartridge 3 will be explained.

Figure 7:
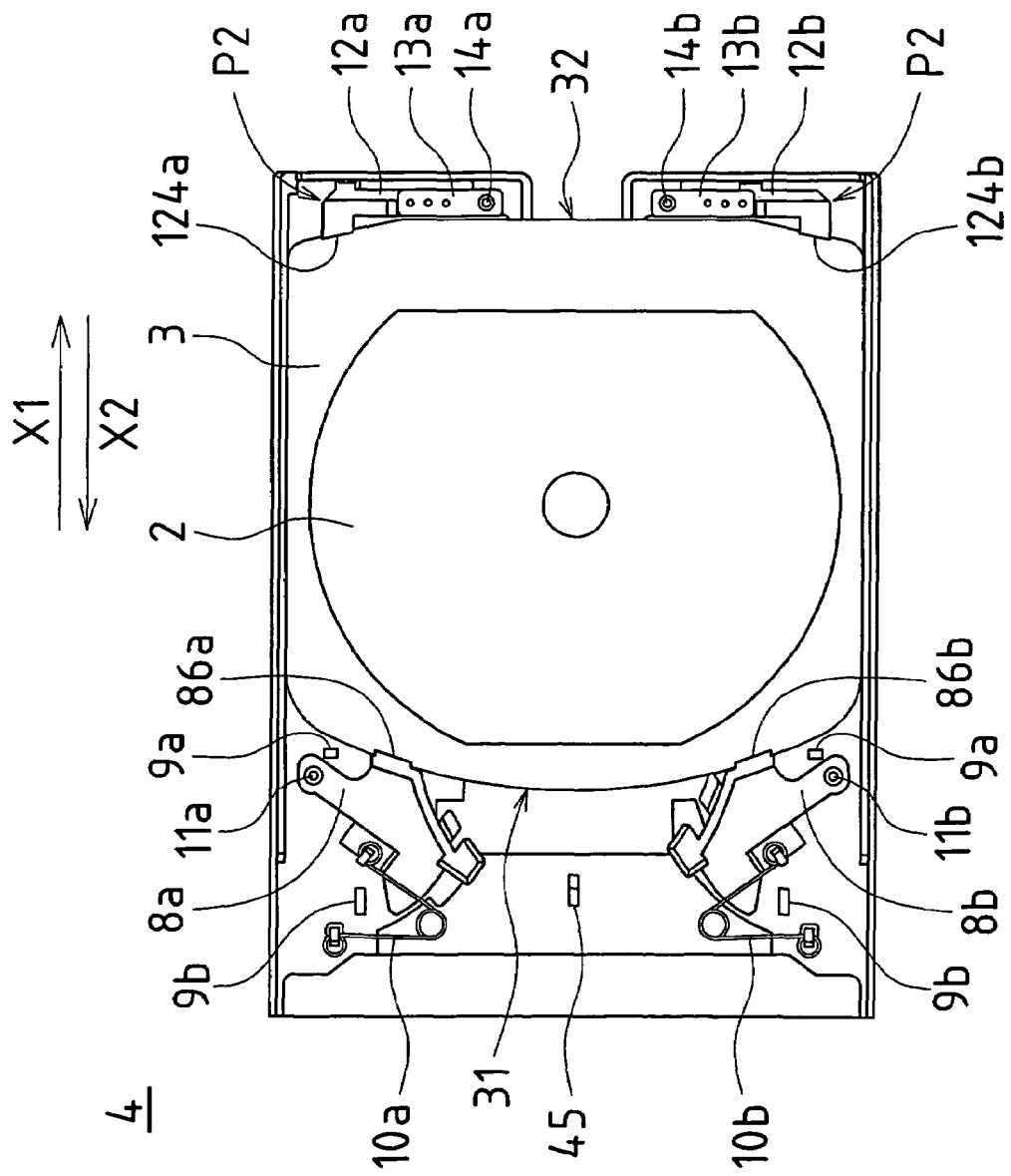
FIG. 7 is a plan view of a state in which a cartridge is mounted on a tray of an optical disc device according to Embodiment 1 of the present invention.

As shown in FIG. 7, the rear-end holding members 12a and 12b are placed at the location of the cartridge guide position P2. When loading the cartridge 3, the front end 31 of the cartridge 3 touches the cartridge restricting portions 85a and 85b. Then, while in such a state, the front-end holding members 8a and 8b are pressed against the springs 10a and 10a, pivoting the front-end holding member 8a clockwise and pivoting the front-end holding member 8b counterclockwise.

Then, the cartridge 3 is moved in the loading direction (direction X2), and, at a location in which the rear end 32 of the cartridge 3 is past the second cartridge thickness direction restricting portions 124a and 124b of the rear-end holding member 12a and 12b, the cartridge 3 is brought down onto the cartridge mounting surface 41 of the tray 4. Subsequent to lowering of the cartridge 3 onto the cartridge mounting surface 41, the springs 10a and 10b bias the front-end holding member 8a counterclockwise and the front-end holding member 8b clockwise, pressing the cartridge 3 that is in contact with the front-end holding members 8a and 8b in the direction (direction X1) opposite to the loading direction (direction X2) so that the cartridge 3 is held by the rear-end holding members 12a and 12b. Therefore, with the help of the first cartridge thickness direction restricting portions 86a and 86b of the front-end holding members 8a and 8b and the second cartridge thickness direction restricting portions 124a and 124b of the rear-end holding members 12a and 12b, the cartridge 3 does not fall off even when the mounting surface of the tray 4 is set vertically.

As described above, after mounting the disc 2 or the cartridge 3 on the tray 4, when the optical disc device 1 detects a loading signal of the tray 4, the loading mechanism retracts the tray 4 into the optical disc device 1. When the tray 4 is loaded to the loaded position, the protrusion 45 that has been provided on the tray 4 touches the contact 72 of the clamper arm 7, and the clamper arm 7 is pivoted against the blade spring of the clamper arm 7, lowering the clamper 71. At the same time, the chassis 5 is raised, and the disc 2 becomes chucked between the turn table 54 of the spindle motor 52 and the clamper 71. Then, recording or reproducing of the information of the disc 2 is performed by the optical disc device 1 as the optical pickup 53 moves in the radial direction of the disc 2.

As described above, according to the optical disc device 1 of Embodiment 1, since the tray 4 is provided with a holding mechanism that can pivot around the predetermined supporting point in a direction of a face of the disc 2 or the cartridge 3 mounted thereon, the holding mechanism pivots on the tray 4 without protruding in the thickness direction of the tray 4, which makes it possible to reduce the thickness of the tray 4. In addition, the holding mechanism does not impose any limitations on the layout of components under the tray 4, thereby making it possible to reduce the thickness of the optical disc device 1.

In addition, both the disc 2 and the cartridge 3 can be mounted on the tray 4 since the front-end holding members 8a and 8b are provided with the first disc radial direction restricting portions 81a and 81b, the first disc thickness direction restricting portions 82a and 82b, the disc bottom guide portions 84a and 84b, the cartridge restricting portions 85a and 85b, and the first cartridge thickness direction restricting portions 86a and 86b. Additionally, since the front end 31 of the cartridge 3 is restricted in the cartridge thickness direction, the cartridge 3 does not fall off and is held in place on the tray 4 even when the mounting surface of the tray 4 is set vertically. Movement of the disc 2 or the cartridge 3 that is mounted on the single disc mounting space 43 or the cartridge mounting space 44 can thus be restricted in all the directions.

In addition, since the front-end holding members 8a and 8b are biased with the springs 10a and 10b so that the single disc mounting space 43 is formed, it is not only easy to mount the disc 2 on the predetermined single disc mounting surface 42 when mounting the disc 2 on the tray 4, but also easy to mount the cartridge 3 on the predetermined cartridge mounting surface 44 as the cartridge 3 is pressed and held by the bias force of the springs 10a and 10b when mounting the cartridge 3 on the tray 4. Additionally, the disc 2 or the cartridge 3 can be mounted on the tray 4 without falling off even when the mounting surface of the tray 4 is set vertically.

In addition, both the disc 2 and the cartridge 3 can be mounted on the tray 4 since the rear-end holding members 12a and 12b are provided with the second disc radial direction restricting portions 122a and 122b, the second disc thickness direction restricting portions 123a and 123b, and the second cartridge thickness direction restricting portions 124a and 124b. Additionally, since the rear end 32 of the cartridge 3 is restricted in the cartridge thickness direction, the cartridge 3 is held on the tray 4 without falling off even when the mounting surface of the tray 4 is set vertically. Movement of the disc 2 or the cartridge 3 that is mounted on the single disc mounting space 43 or the cartridge mounting space 44 can thus be restricted in all the directions.

In addition, since a plurality of holding mechanisms, total of four in two types in the case of Embodiment 1, have been provided, the disc 2 or the cartridge 3 is more securely held compared to when using only one holding mechanism of a single type. It should be noted that the number and the type of the holding mechanism are not limited and can be arbitrarily selected.

Although the front-end holding members 8a and 8b and the rear-end holding members 12a and 12b are configured independently according to Embodiment 1, the present invention is not limited to this configuration. The front-end holding members 8a and 8b and the rear-end holding members 12a and 12b may be configured such that their movements are linked, and this is more preferable in order to hold the disc 2 or the cartridge 3 than when they are independently configured.

In addition, although the same disc is used for the single disc 2 and for the disc 2 that is housed in the cartridge according to Embodiment 1, the present invention is not limited to this.

Embodiment 2

An optical disc device according to Embodiment 2 has the same configuration as the above-described optical disc device 1 according to Embodiment 1 except for differences in the front-end holding members. For this reason, in Embodiment 2, only the different points related to the front-end holding members will be explained and explanation on the other same configurations will be omitted.

Figure 8:
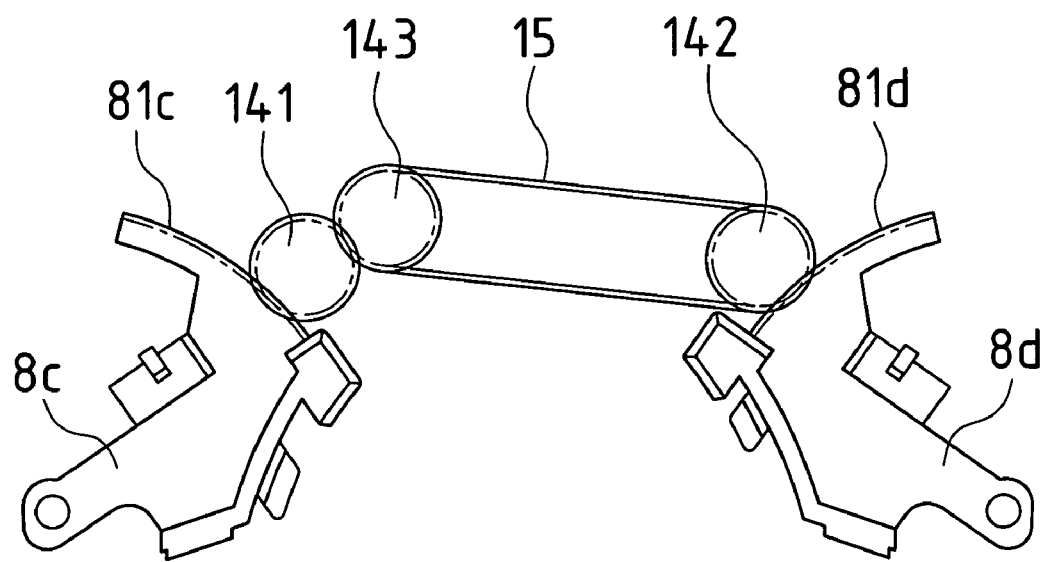
FIG. 8 is a plan view of a front-end holding member that is provided in an optical disc device according to Embodiment 2 of the present invention.

As shown in FIG. 8, in an optical disc device 1 according to Embodiment 2, gear portions 81c and 81d, which have the center position of the pivotal movement as their cores, are provided at a part of the front-end holding members 8c and 8d, and these gear portions 81c and 81d are configured to be engaged with gears 141 and 142, respectively.

A timing belt 15 and a gear 143 are provided between the gear 141 and the gear 142 as shown in FIG. 8 to achieve a configuration so that one of the front-end holding members, either 8c or 8d, is pivoted by these gears 141, 142, and 143 and the timing belt 15 and so that the other front-end holding member, either 8d or 8c, is pivoted in synchronization therewith. In other words, the pivotal movements of the front-end holding members 8c and 8d are linked with each other.

As described above, an optical disc device 1 according to Embodiment 2 not only has the operational effects of the above-described optical disc device 1 according Embodiment 1, but also makes it even easier to mount the disc 2 or the cartridge 3 on the predetermined mounting surfaces 43 or 44 of the tray 4 as the pivotal movements of the front-end holding members 8c and 8d are linked with each other.

As explained above, the present invention makes it possible to provide a small-sized optical disc device that can handle both a single disc and a cartridge housing a disc as an external information storage medium to be mounted on a tray and that allows arbitral selection of the tray setting direction such as horizontal and vertical.

In other words, in an optical disc device according to the present invention, a tray is provided with a holding mechanism, and the holding mechanism can pivot around a predetermined supporting point in a direction of a face of the single disc or cartridge to be mounted, which makes it possible to reduce the thickness of the tray as the holding mechanism is pivoted on the tray without protruding in the thickness direction of the tray. In addition, since the holding mechanism imposes no limitations on the layout of components under the tray, the thickness of the optical disc device can be reduced.

The present invention can be embodied and practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

In addition, this application claims priority on Patent Application No 2003-179884 filed in Japan on Jun. 24, 2003, the entire content of which are hereby incorporated by reference.

INDUSTRIAL APPLICABILITY

The present invention may be applied to an optical disc device to which an optical disc in forms including but not limited to single optical disc and cartridge housing an optical disc can be loaded.

The invention claimed is:

1. An optical disc device that records information on and reproduces information from either (i) a single disc or (ii) a cartridge housing a disc after the single disc or the cartridge is mounted on a mounting surface of a tray, and then the tray is loaded into a body of the optical disc device, wherein the tray is provided with a mounting space capable of accommodating either one of a single disc mounting space or a cartridge mounting space, which mounting space is formed according to the respective shapes of the single disc and the cartridge to be mounted, and the tray is also provided with a holding mechanism and a predetermined supporting point for the holding mechanism, the holding mechanism holding one of the single disc or the cartridge in either a horizontal orientation or a vertical orientation in the respective mounting space, said orientation defining a planar direction of the mounted single disc or cartridge, and the holding mechanism is structured and arranged to pivot around a predetermined supporting point in said planar direction, wherein the tray comprises a mounting surface in the mounting space and, in order to mount a single disc on the mounting surface in a single disc mounting space, the holding mechanism is provided with a first disc radial direction restricting portion whose radius is larger than that of the single disc as measured from an approximate center thereof when the single disc is mounted on the tray, a first disc thickness direction restricting portion that restricts movement of the single disc in a disc thickness direction, and a disc bottom guide portion that guides the single disc to the mounting surface, and in order to mount the cartridge on the mounting surface in a cartridge mounting space, the holding mechanism is further provided with a cartridge restricting portion that has the same shape as at least a part of a front end of the cartridge as viewed in a loading direction to the tray, and a first cartridge thickness direction restricting portion that restricts movement of the cartridge in a cartridge thickness direction and that has the same shape as at least a part of a front end of the cartridge as viewed in a loading direction to the tray.

2. The optical disc device according to claim 1, wherein the holding mechanism is biased with an elastic member so that the single disc mounting space is formed.

3. The optical disc device according to claim 2, wherein a plurality of the holding mechanisms are provided.

4. The optical disc device according to claim 3, wherein pivotal movements of the plurality of holding mechanisms are linked with each other.

5. An optical disc device that records information on and reproduces information from either of (i) a single disc or (ii) a cartridge housing a disc after the single disc or the cartridge is mounted on a mounting surface of a tray, and then the tray is loaded into a body of the optical disc device, wherein the tray is provided with a mounting space capable of accommodating either one of a single disc mounting space or a cartridge mounting space, which mounting space is formed according to the respective shapes of the single disc and the cartridge to be mounted, and the tray is also provided with a holding mechanism and a predetermined supporting point for the holding mechanism, the holding mechanism holding one of the single disc or the cartridge in either a horizontal orientation or a vertical orientation in the respective mounting space, said orientation defining a planar direction of the mounted single disc or cartridge, and the holding mechanism is structured and arranged to pivot around a predetermined supporting point in said planar direction, wherein the tray comprises a mounting surface in the mounting space and, in order to mount a single disc on the mounting surface in a single disc mounting space, the holding mechanism is provided with a second disc radial direction restricting portion whose radius is larger than that of the single disc as measured from an approximate center thereof when the single disc is mounted on the tray, and a second disc thickness direction restricting portion that restricts movement of the single disc in a disc thickness direction, and in order to mount a cartridge on the mounting surface in a cartridge mounting space, the holding mechanism is further provided with a second cartridge thickness direction restricting portion that restricts movement of the cartridge in a cartridge thickness direction and that has the same shape as at least a part of a rear end of the cartridge as viewed in a loading direction to the tray.

6. The optical disc device according to claim 5, wherein a plurality of the holding mechanisms are provided.

7. An optical disc device that records information on and reproduces information from either of (i) a single disc or (ii) a cartridge housing a disc after the single disc or the cartridge is mounted on a mounting surface of a tray, and then the tray is loaded into a body of the optical disc device, wherein the tray is provided with a mounting space capable of accommodating either one of a single disc mounting space or a cartridge mounting space, which mounting space is formed according to the respective shapes of the single disc and the cartridge to be mounted, and the tray also is provided with a holding mechanism and a predetermined supporting point for the holding mechanism, the holding mechanism holding one of the single disc or the cartridge in either a horizontal orientation or a vertical orientation in the respective mounting space, said orientation defining a planar direction of the mounted single disc or cartridge, and the holding mechanism is structured and arranged to pivot around a predetermined supporting point in said planar direction when the cartridge is being mounted.

* * * * *